United States Patent
Curran et al.

(10) Patent No.: US 9,575,529 B2
(45) Date of Patent: Feb. 21, 2017

(54) VOLTAGE DROOP REDUCTION IN A PROCESSOR

(71) Applicant: INTERNATIONAL BUSINESS MACHINES CORPORATION, Armonk, NY (US)

(72) Inventors: Brian W. Curran, Poughkeepsie, NY (US); Preetham M. Lobo, Bangladore (IN); Richard F. Rizzolo, Poughkeepsie, NY (US); James D. Warnock, Yorktown Heights, NY (US); Tobias Webel, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/863,995

(22) Filed: Sep. 24, 2015

(65) Prior Publication Data
US 2016/0098070 A1   Apr. 7, 2016

(30) Foreign Application Priority Data

Oct. 2, 2014 (GB) .................................. 1417446.0

(51) Int. Cl.
   *G06F 1/26* (2006.01)
(52) U.S. Cl.
   CPC ....................................... *G06F 1/26* (2013.01)
(58) Field of Classification Search
   CPC ........................................................ G06F 1/26
   See application file for complete search history.

(56) References Cited

U.S. PATENT DOCUMENTS

| 6,564,328 B1 * | 5/2003 | Grochowski | ......... G06F 1/3203 712/E9.049 |
| 7,685,458 B2 | 3/2010 | Yamaoka | |

(Continued)

FOREIGN PATENT DOCUMENTS

WO   WO 2013/162589 A   10/2013

OTHER PUBLICATIONS

Gupta et al., "Understanding Voltage Variations in Chip Multiprocessors Using a Distributed Power-Delivery Network", Northwestern University, 6 pages (2007).

(Continued)

*Primary Examiner* — Mark Connolly
(74) *Attorney, Agent, or Firm* — Steven Chiu, Esq.; Kevin P. Radigan, Esq.; Heslin Rothenberg Farley & Mesiti P.C.

(57) ABSTRACT

A processor is provided having a common supply rail, and one or more processor cores, where the one or more processor cores share the common supply rail. Each processor core(s) includes a core dIPC value output and a core throttling signal input, and a chip power management logic, which has at least one input for inputting the core dIPC value, a threshold register for a dIPC threshold value, a chip dIPC register for a current global dIPC value, at least one chip dIPC history register for a historic global dIPC value, a subtractor providing an absolute difference of an average historic global dIPC derived from the historic global dIPC value and the current global dIPC value, a magnitude comparator providing a throttling signal when the absolute difference is above the dIPC threshold value, and at least one output for outputting a core throttling signal to the processor core(s).

17 Claims, 7 Drawing Sheets

(56) References Cited

U.S. PATENT DOCUMENTS

| | | | |
|---|---|---|---|
| 8,862,924 B2* | 10/2014 | Emberling | G06F 9/3836 |
| | | | 713/340 |
| 2008/0109634 A1* | 5/2008 | Chrysos | G06F 1/3203 |
| | | | 712/1 |
| 2009/0328055 A1 | 12/2009 | Bose et al. | |
| 2012/0005515 A1 | 1/2012 | Reddi et al. | |
| 2013/0262831 A1 | 10/2013 | Nelson et al. | |
| 2013/0268747 A1 | 10/2013 | Chang et al. | |
| 2014/0157277 A1 | 6/2014 | Eisen et al. | |

OTHER PUBLICATIONS

Kim et al., "Enabling On-Chip Switching Regulators for Multi-Core Processors Using Current Staggering", Harvard University, 11 pages, (2007).

Fan et al., "Performance Analysis of GALS Datalink Based on Pausible Clocking", 18th IEEE International Symposium on Asynchronous Circuits and Systems (ASYNC.2012), 8 pages (2012).

Curran et al., GB Search Report for GB Application No. GB1417446.0, dated Mar. 24, 2015 (3 pages).

* cited by examiner

| Performance | Performance [%] | Suspend pattern |
|---|---|---|
| 16/16 | 100.00 | 00 00 00 00 00 00 00 00 |
| 15/16 | 93.75 | 10 00 00 00 00 00 00 00 |
| 14/16 | 87.50 | 10 00 00 00 10 00 00 00 |
| 13/16 | 81.25 | 11 00 00 00 10 00 00 00 |
| 12/16 | 75.00 | 11 00 00 00 11 00 00 00 |
| 11/16 | 68.75 | 11 10 00 00 11 00 00 00 |
| 10/16 | 62.50 | 11 10 00 00 11 10 00 00 |
| 9/16 | 56.25 | 11 11 00 00 11 10 00 00 |
| 8/16 | 50.00 | 11 11 00 00 11 11 00 00 |
| 7/16 | 43.75 | 11 11 10 00 11 11 00 00 |
| 6/16 | 37.5 | 11 11 10 00 11 11 10 00 |
| 5/16 | 31.25 | 11 11 11 00 11 11 10 00 |
| 4/16 | 25.00 | 11 11 11 00 11 11 11 00 |
| 3/16 | 18.75 | 11 11 11 10 11 11 11 00 |
| 2/16 | 12.50 | 11 11 11 10 11 11 11 10 |
| 1/16 | 6.25 | 11 11 11 11 11 11 11 10 |
| 0/16 | 0.00 | 11 11 11 11 11 11 11 11 |

Fig. 6

VOLTAGE DROOP REDUCTION IN A PROCESSOR

PRIOR FOREIGN APPLICATION

This application claims priority from United Kingdom (GB) patent application number 1417446.0, filed Oct. 2, 2014, which is hereby incorporated herein by reference in its entirety.

BACKGROUND

The embodiment of the invention relates generally to reducing power grid noise in a processor and particularly to reducing power grid noise in a processor while minimizing performance loss.

In high performance processors, or other integrated circuits (ICs), to increase the processing performance of the processor, the processor chip design typically includes one or more of one or more processor cores and one or more pipelines connecting the processor cores. In addition, in a high performance system, processor system designs often include multiple chips sharing a common supply rail of a power distribution network providing a supply voltage. As the number of processor cores on a same chip or across multiple chips, all sharing a common supply rail, increases, the number of circuits that switch per clock cycle also increases.

In a processor there is noise generated by circuit switching activity at each clock cycle by nodes, busses, and other circuit components sharing a common supply rail. One result of noise generated by circuit switching activity, also referred to as power grid noise or di/dt noise, is that a sudden increase in noise will induce a droop in the supply voltage to the common supply rail of the power distribution network. A sudden, large droop in the supply voltage slows down the circuit response and therefore could cause timing errors on the logical circuit.

To reduce the noise generated by circuit switching activity, a processor may include decoupling capacitors positioned near the switching circuits of the processor cores, where the decoupling capacitors act as a charge reservoir and help reduce noise on the power distribution network as circuit switching activity increases. The supply voltage droop $\Delta V$ induced by an increase in circuit switching activity at the chip level is proportional to $\Delta I*$square root $(L/C)$, where $\Delta I$ is the increase in current required by chip level switching circuits on the common supply rail, L is the inductance from the chip level circuits to printed-circuit-board or package level, and C is the summed, chip level capacitance of the circuits on the common supply rail. Since many cores can be activated simultaneously, one limitation of implementing decoupling capacitors to reduce noise is in the case where there is a sudden burst of activity on one or more processor cores, increasing the current, and because $\Delta I$ is directly proportional to the number of cores on the common supply rail, the sudden increase in $\Delta I$ outweighs the noise reduction by the charge reservoirs of the decoupling capacitors, triggering a voltage droop.

To address this problem US 2014/0157277 A1 proposes a method for managing a processor comprising monitoring for an increase in logical operation activity from a low level to a high level during a sampling window across a plurality of cores sharing a common supply rail of the processor, responsive to the processor detecting the increase in logical operation activity from the low level to the high level during the sampling window, limiting the logical operations executed on the plurality of cores during a lower activity period to a level of logical operations set between the low level and a medium level, where the medium level is an amount between the low level and the high level; responsive to the lower activity period ending, gradually decreasing the limit on the logical operations executed on the plurality of cores to resume normal operations. The known method may not detect all logical operation activities which may lead to a voltage droop.

SUMMARY

In view of the foregoing, there may be a need for an improved processor and method for reducing power grid noise to reduce any voltage droop, while minimizing performance loss, in a processor system with multiple processor cores sharing a common supply rail.

According to one or more aspects, a processor is provided comprising a common supply rail, one or more processor cores, wherein the one or more processor cores share the common supply rail. Each of the one or more processor cores comprises an output for outputting a core dynamic instructions per cycle (dIPC) value and an input for inputting a core throttling signal, and a chip power management logic. The chip power management logic comprises at least one input for inputting the core dIPC value, a threshold register for registering a dIPC threshold value, a chip dIPC register for registering a current global dIPC value derived from the at least one core dIPC value, at least one chip dIPC history register for registering a historic global dIPC value, a subtractor providing an absolute difference of an average historic global dIPC derived from the historic global dIPC value and the current global dIPC value, a magnitude comparator providing a throttling signal when the absolute difference is above the dIPC threshold value, and at least one output for outputting a core throttling signal to the at least one processor core.

According to one or more other aspects, a method is provided for managing a processor, wherein the processor comprises a common supply rail and one or more processor cores being connected to the common supply rail. The method comprises generating for each processor core a dIPC value indicative of an activity level of the respective processor core; deriving a current global dIPC value from the dIPC values of the one or more processor cores; calculating the absolute difference of the current global dIPC value and an average global historic dIPC value; comparing the absolute difference of the current global dIPC value and the average global historic dIPC value with a threshold global dIPC value; and triggering a threshold signal if the absolute difference of the current global dIPC value and the average global historic dIPC value is above the threshold global dIPC value.

BRIEF DESCRIPTION OF THE DRAWINGS

In the drawings:

FIG. 6 shows an exemplary suspend pattern, in accordance with one or more aspects of the present invention.

DETAILED DESCRIPTION

Figure 1:
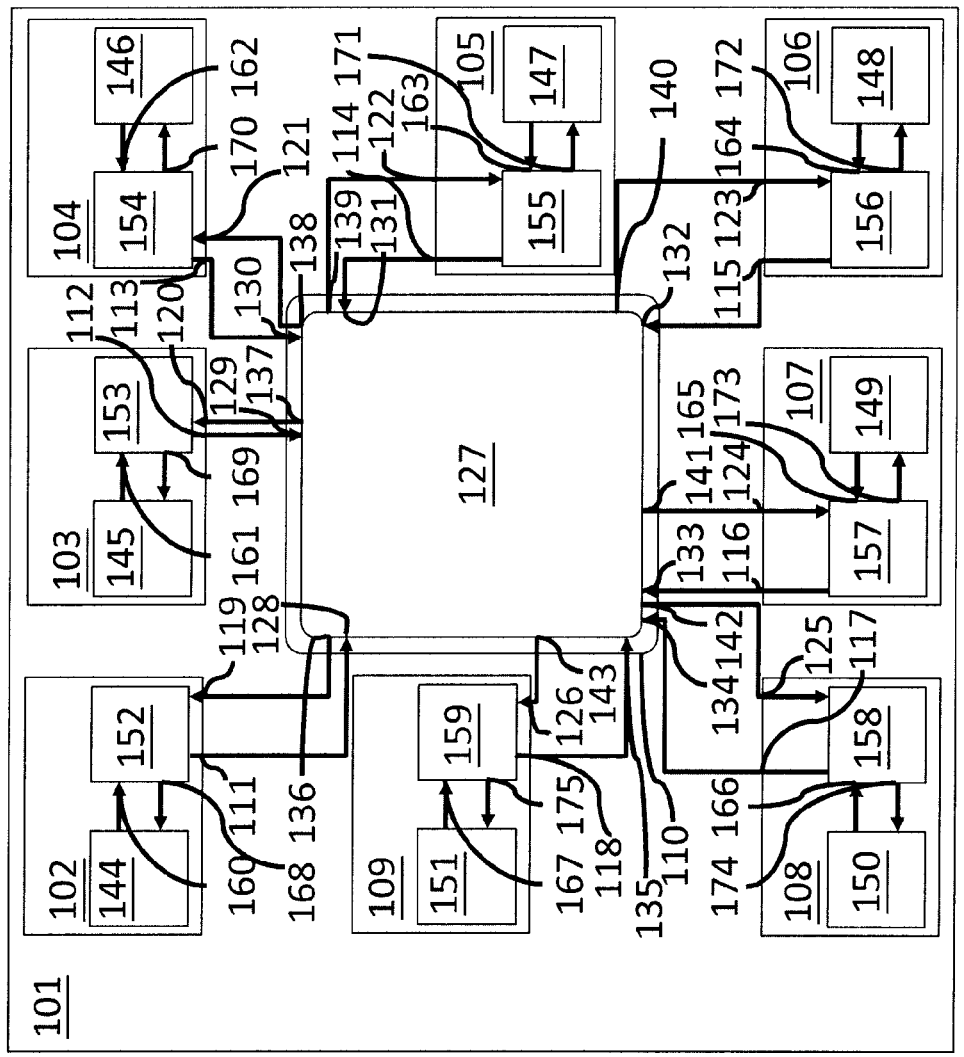
FIG. 1 shows one embodiment of a processor, in accordance with one or more aspects of the present invention.

As explained further below, in one or more aspects, instructions per cycle (IPC) are being dynamically changed herein. Thus, the term dynamic instructions per cycle (dIPC) is used throughout this description.

For one or more aspects of the present invention, the invention may be implemented in a processor comprising a common supply rail, one or more processor cores, wherein the one or more processor cores share the common supply rail, and wherein each of the one or more processor cores comprises an output for outputting a core dIPC value and an input for inputting a core throttling signal, and a chip power management logic, in particular separate from the one or more processor cores, wherein the chip power management logic comprises at least one input for inputting the core dIPC value, a threshold register for registering a dIPC threshold value, a chip dIPC register for registering a current global dIPC value derived from the at least one core dIPC value, at least one chip dIPC history register for registering a historic global dIPC value, a subtractor providing an absolute difference of an average historic global dIPC derived from the historic global dIPC value and the current global dIPC value, a magnitude comparator providing a throttling signal when the absolute difference is above the dIPC threshold value, at least one output for outputting a core throttling signal to the at least one processor core may in particular be adapted for processor cores operating mostly in a synchronous mode.

According to one embodiment of the processor, the current global dIPC value may be identical to the at least one core dIPC value. Such embodiment(s) may save valuable die surface if the processor comprises only one processor core.

In a further embodiment of the processor, the chip power management logic may further comprise a first adder providing the current global dIPC value as a sum of the core dIPC values. Adding the core dIPC values of the multiple cores together may allow for a better mitigation of voltage droops due to parallel busy processor cores.

Further, in an embodiment of the processor, the chip power management logic may comprise only one historic global dIPC register and the average historic global dIPC value may be identical to the at least one historic global dIPC value. Using only one historic global dIPC value may be a particularly simple measure for reducing power grid noise.

According to another embodiment of the processor, the chip power management logic may comprise N historic global dIPC registers wherein (wherein N is a defined number), a second adder summing the N historic global dIPC values, a chip dIPC history register for registering the sum of the N historic global dIPC values, and a divisor for providing the average historic global dIPC value as sum of the N historic global dIPC values divided by N. Hence, voltage droops may be better mitigated when not all processor cores perform current consuming operations at exactly the same time, but with a slight offset to one another.

Moreover, in one embodiment of the processor, the threshold register may be a fixed value. A fixed threshold may be less complex and may pose fewer constraints to the hardware implementation.

In another embodiment, the threshold register may be configurable. Hence, the threshold may be adapted to the purpose of the chip. The voltage droops experienced in practice may be different from the theoretically calculated ones. Thus, the possibility to adapt the threshold may be advantageous.

According to a further embodiment of the processor, the processor core may comprise a core power management logic, wherein the core power management logic comprises an input for inputting at least one core event, an input for receiving a core throttling signal, an output for outputting a core dIPC value derived from the at least one core event, a power throttling unit for generating a sequence of suspend signals upon receipt of a throttling signal, an output for outputting a suspend pattern. Providing a core power management logic at the processor core level and a chip power management logic at the processor chip level may be advantageous as processor core specific power management may be handled on processor core level very fast and at the same time the power management can also be adapted to the power consumption of all processor cores.

Moreover, in certain embodiments of the processor, the core power management logic may comprise an inputs for inputting S1 core events (where S1 is a set number), a selector for selecting S2 of the S1 core events (where S2 is a second set number), an adder for adding the S2 core events and to obtain a dIPC core cycle value, a dIPC core cycle register register for storing the dIPC core cycle value, and wherein the core dIPC value is derived from the dIPC core cycle value. Such embodiment(s) may allow to select only the core events having a strong impact on power consumption. Less important events may be disregarded. Avoiding further processing of less important events may result in a less complex chip design.

In another embodiment of the processor, the core power management logic may comprise an adder for summing the dIPC core cycle value over a predetermined number of cycle times S3 (where S3 is a set number), and a core dIPC value register for storing the sum of the S3 dIPC core cycle values, and wherein the core dIPC value is derived from the sum of the S3 dIPC core cycle values. Hence, the time frame, in which the core events are monitored may be adapted to the needs.

Further, in an embodiment of the processor, the core power management logic may comprise a weighting unit to attribute a weight to at least one of the S2 core events before adding the S2 core events. Thus, the core events may be weighted according to their influence on electrical current consumption.

According to another embodiment of the processor, the core power management logic may comprise a selector for selecting S4 consecutive bits of the dIPC core cycle value stored in the dIPC core cycle register or the sum of the dIPC core cycle values stored in the core dIPC value register for obtaining the core dIPC value (where S4 is a defined number). The sum of the dIPC core cycle values may only deviate slightly from an average value from timeframe to timeframe. Selecting only S4 consecutive bits may allow to detect these small deviations without the need to consider all the further bits in further signal processing. Hence, die surface for connecting lines may be saved.

In a further embodiment of the processor, the core power management logic may comprise a configurable dIPC value selection register for selecting which consecutive S4 bits of the dIPC core cycle value stored in the dIPC core cycle register or the sum of the dIPC core cycle values stored in the core dIPC value register are selected. The average value of the sum of the dIPC core cycle values may change depending on the computer, which comprises the processor. The configurable dIPC value selection register may allow to adapt the processor to this change.

Moreover, in an embodiment of the processor, the core power management logic may comprise an overflow handler for performing overflow handling before outputting the core dIPC value. The value of the sum of the core cycle values may deviate more than expected from the average sum of the core cycle values. An overflow handler for performing overflow handling may reduce the risk that high values of the sum of the core cycle values accidently lead to a small core dIPC value.

In one or more other aspects of the present invention, a method is provided for managing a processor, wherein the processor comprises a common supply rail and one or more processor cores being connected to the common supply rail, comprising generating for each processor core a dIPC value indicative of an activity level of the respective processor core; deriving a current global dIPC value from the dIPC values of the one or more processor cores; calculating the absolute difference of the current global dIPC value and an average global historic dIPC value; comparing the absolute difference of the current global dIPC value and the average global historic dIPC value with a threshold global dIPC value; and triggering a threshold signal if the absolute difference of the current global dIPC value and the average global historic dIPC value is above the threshold global dIPC value may reduce voltage droops in the common supply rail.

In one or more embodiments, the method comprises adding the dIPC values of the cores to obtain the current global dIPC value.

In a further embodiment, the method comprises calculating the average global historic dIPC value based on at least two, in particular consecutive, global historic dIPC values.

One or more further embodiments relate to a method for managing a processor with a plurality of cores sharing a common supply rail of the processor, wherein the method comprises periodically sampling, by each core, the number of instructions executed in three consecutive time windows and determining an activity level of low, medium, high for each time window in dependence to expected minimum to maximum numbers of instructions, generating, by the processor, a sudden burst signal per core when the activity levels for the consecutive time windows of the respective core are either high, low, high or low, med, high in order of time, responsive to the processor generating a sudden burst signal for at least two cores, limiting, by the processor, the logical operations executed on the plurality of cores during a lower activity period to a level of logical operations set between the low level and the medium level, and responsive to the lower activity period ending, gradually decreasing, by the processor, the limit on the logical operations executed on the plurality of cores to resume normal operations.

In one or more additional embodiments, a design structure readable by a machine used in design, manufacture or simulation of integrated circuit may be provided. The design structure may comprise a representation of a processor according to any one of the above-summarized aspects of the present invention.

FIG. 1 shows a processor 101 comprising eight processor cores 102 to 109 and a nest 110 providing the common infrastructure for the eight cores 102 to 109. The eight processor cores 102 to 109 are connected to a common supply rail, which is not shown in FIG. 1. Each processor core 102 to 109 has an output 111 to 118, respectively, for outputting a dIPC value and an input 119 to 126, respectively, for inputting a core throttling signal. The nest 110 comprises a chip power management logic 127 having inputs 128 to 135 for inputting the dIPC value provided by the output 111 to 118 of the respective processor core 102 to 109. Moreover, the chip power management logic 127 includes outputs 136 to 143 for outputting a core throttling signal to the inputs 119 to 126 of the processor cores 102 to 109.

The core dIPC value may be a $2^m$ bit value, in particular a 4 bit value, and the core throttling signal may be a $2^m$ bit value, wherein m is less than n, in particular a 1 bit value. The selection of a 4 bit dIPC value may be a good compromise between more analysing capacity within the chip power management logic 127 and less consumption of the valuable chip surface due to the necessary conducting paths.

Each processor core 102 to 109 may include a core unit 144 to 151 and a chip power management logic 152 to 159. Each chip power management logic 152 to 159 comprises an input 160 to 167 for inputting core events and an output 168 to 175 for outputting a suspend signal.

Figure 2:
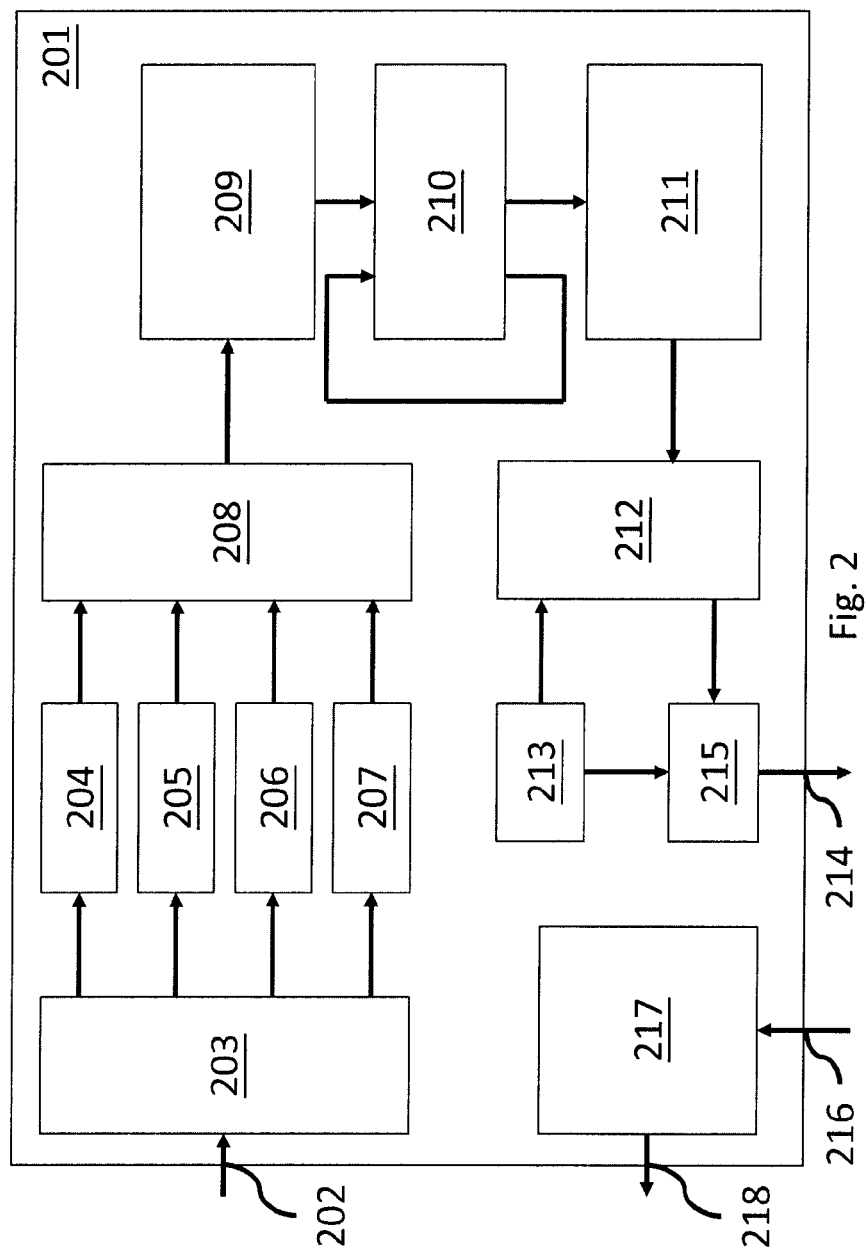
FIG. 2 shows one embodiment of a core power management logic, in accordance with one or more aspects of the present invention.

FIG. 2 shows a core power management unit 201, which may be used as a core power management unit 152 to 159, in greater detail. The core power management unit 201 comprises an input 202 for inputting S1 core events indicative if a certain type of instruction is executed by the core unit attributed to the core power management unit 201. The selection of S1=15 different types of instructions may allow for a good power management while reducing the communication paths from the core unit to the core power management unit 201.

The S1 different core events may have a different influence on, for example, power consumption, power grid noise and/or heat dissipation. The core power management unit 201 may thus further include a selector 203 for selecting S2 of the S1 core events for further processing. In the implementation shown in FIG. 2, S2=4 events may be selected for further processing. The selector 203 may also be reconfigurable to change the S2 core events to be selected for further processing.

Furthermore, a weight may be attributed to each of the selected S2 of S1 core events through weighting units 204 to 207 indicative of the influence of the selected core event on, for example, power consumption, heat dissipation and/or grid noise, in particular voltage droops. The weight may be in particular an unsigned value to facilitate further calculation, more particularly an unsigned 4-bit value. A weighted core event adder 208 may be used to add the weighted core events together and to obtain a single dIPC core cycle value for each core unit cycle, which may be temporarily stored in a dIPC core cycle register 209.

An adder 210 and a core dIPC value register 211 may be used to sum up the dIPC core cycle values over a configurable number of cycle times S3. Having reached the predetermined number of cycle times S3 all bits of the core dIPC value register 211 may be reset to zero. The core dIPC value register 211 may be a 22-bit register. S3 may be selected to be above 32 and/or below 128. When using processor core normally operating at 4.8 GHz and using S3=50, the dIPC core cycle values may be summed up over a time period of about 10.4 ns. S3 may also be chosen to be 100 for a processor core normally operating at 4.8 GHz such that the dIPC core cycle values may be summed up over a time period of about 20.8 ns.

A selector 212 may be provided to select S4 consecutive bits of the core dIPC value register 211 based on a reconfigurable dIPC value selection register 213 and to output the S4 consecutive bits as dIPC value at an output 214 of the core power management logic 201.

Furthermore, the core power management logic 201 may comprise an overflow handler 215. The overflow handler 214 may force the dIPC value provided at the output 214 to adopt a maximum value.

Finally, the core power management logic 201 may include an input 216 for inputting a core throttling signal, a performance throttling unit 217 responsive to the core throttling signal and an output 218 for outputting a suspend signal to a core unit (not shown), in particular a core unit 144 to 151 as shown in FIG. 1.

Figure 3:
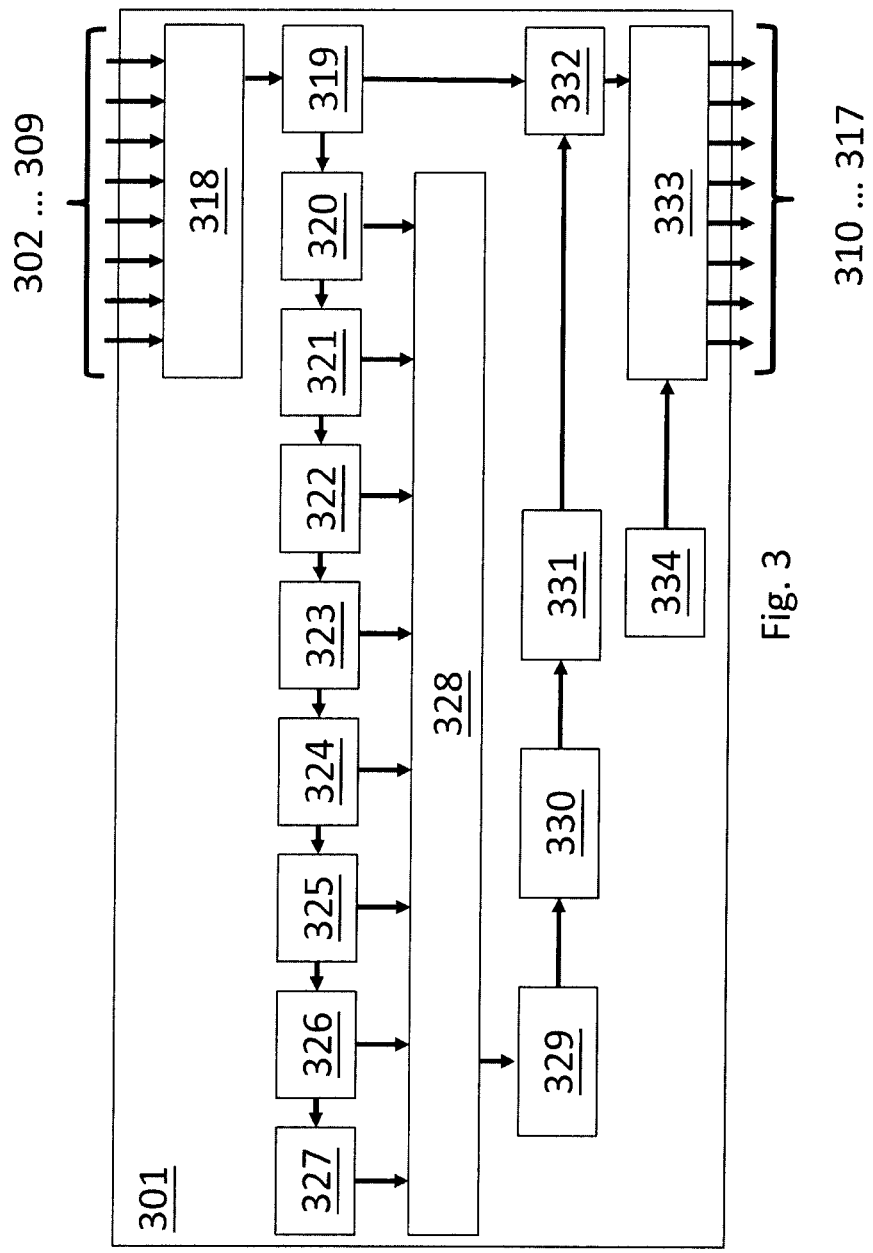
FIG. 3 shows one embodiment of a chip power management logic, in accordance with one or more aspects of the present invention.

FIG. 3 shows one embodiment of a chip power management logic 301. The chip power management logic 301 comprises inputs 302 to 309 for inputting core dIPC values from processor cores and outputs 310 to 317 for outputting throttling signals to the processor cores.

The chip power management logic 301 may further comprise an adder 318 for adding the core dIPC values together and to obtain a current global dIPC value. The current global dIPC value may be stored in a chip dIPC value register 319. Moreover, N historic global dIPC value registers 320 to 327 may be provided to store the N historic global dIPC values for the N preceding time periods, where N is a defined number.

The N historic global dIPC values may be summed up by a further adder 328 and the sum may be stored in a chip dIPC history register 329. A divisor 330 may be provided for dividing the sum by N to obtain an average historic global dIPC value, wherein the average historic global dIPC value may be stored in a average historic global dIPC register 331. Using $N=2^o$, in particular $N=2^3=8$, may allow for a simpler hardware implementation of the divisor 330.

The chip power management logic 301 may further comprise a subtractor 332 to calculate the absolute difference, i.e. the delta, between the average historic global dIPC value and the current global dIPC value. A magnitude comparator 333 serves to compare this absolute difference with a dIPC threshold value stored in a chip dIPC threshold register 334. The chip dIPC threshold register 334 may be configurable to adjust the dIPC threshold value stored therein.

If the absolute difference is greater than the dIPC threshold value the magnitude comparator 333 may output a core throttling signal at the outputs 310 to 317.

Figure 4:
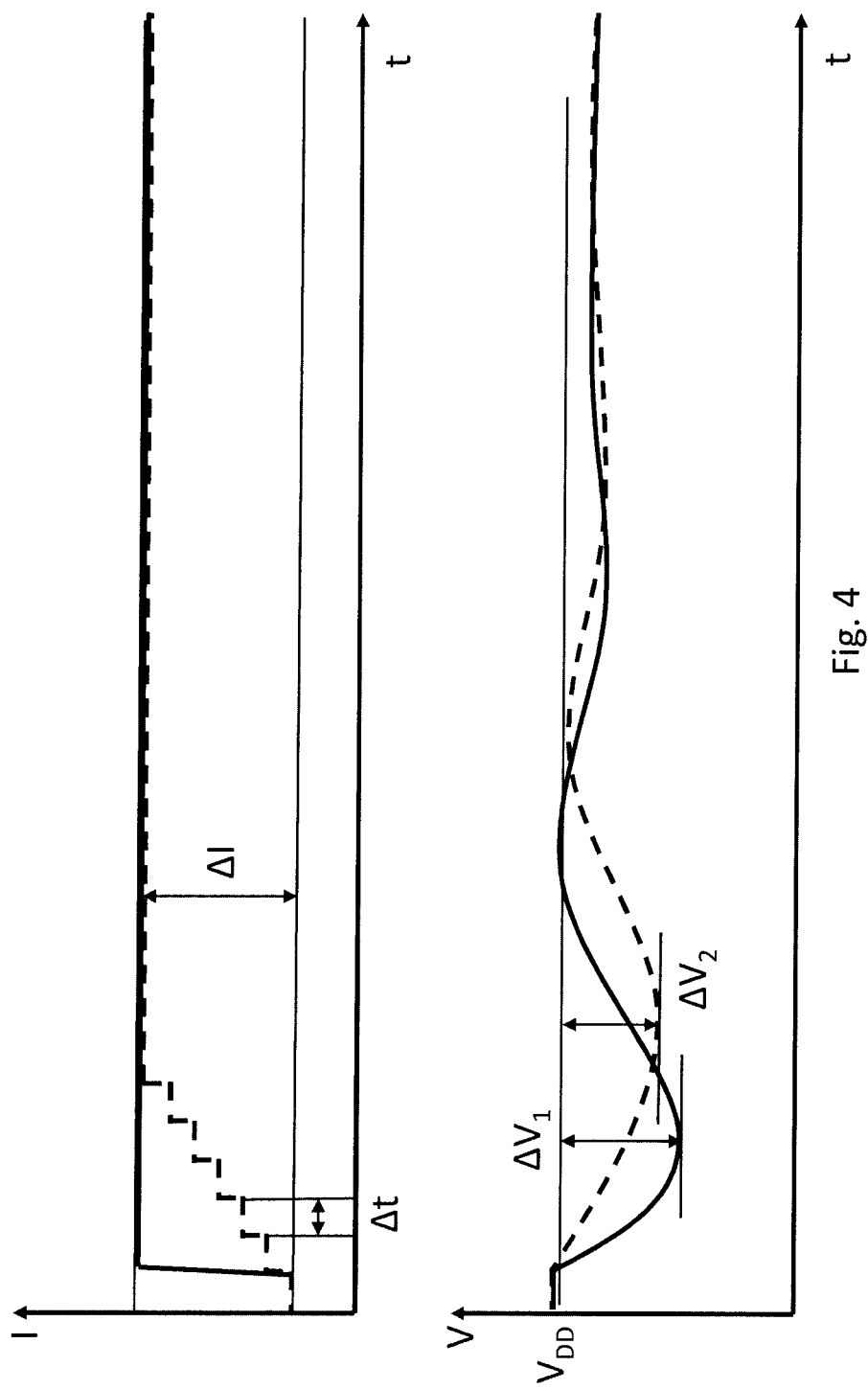
FIG. 4 shows an exemplary common supply rail behavior, in accordance with one or more aspects of the present invention.

The two diagrams in FIG. 4 show the development of common support rail voltage V (lower diagram) in response to common support rail current I (upper diagram) and over time t. Depending on processor core activity the common support rail current I, which has to be provided to the processor cores, may change rapidly (upper diagram, solid line) from, for example, ΔI 150 A to 300 V, or in, for example, steps of Δt, wherein Δt may amount to 10 ns (upper diagram, dashed line). The rapid change in common support rail current I may lead to a voltage droop of, for example, $\Delta V_1=110$ mV with respect to a nominal voltage of $V_{DD}=1.16$ V (lower diagram, solid line), and the step-like change to a voltage droop of, for example, $\Delta V_2=90$ mV with respect to a nominal voltage of $V_{DD}=1.16$ V. Reducing the slope of common support rail current I reduces voltage droops. Thus, lesser voltage guard band may be necessary and the operating frequency of the processor and thus its performance may be increased.

Figure 5:
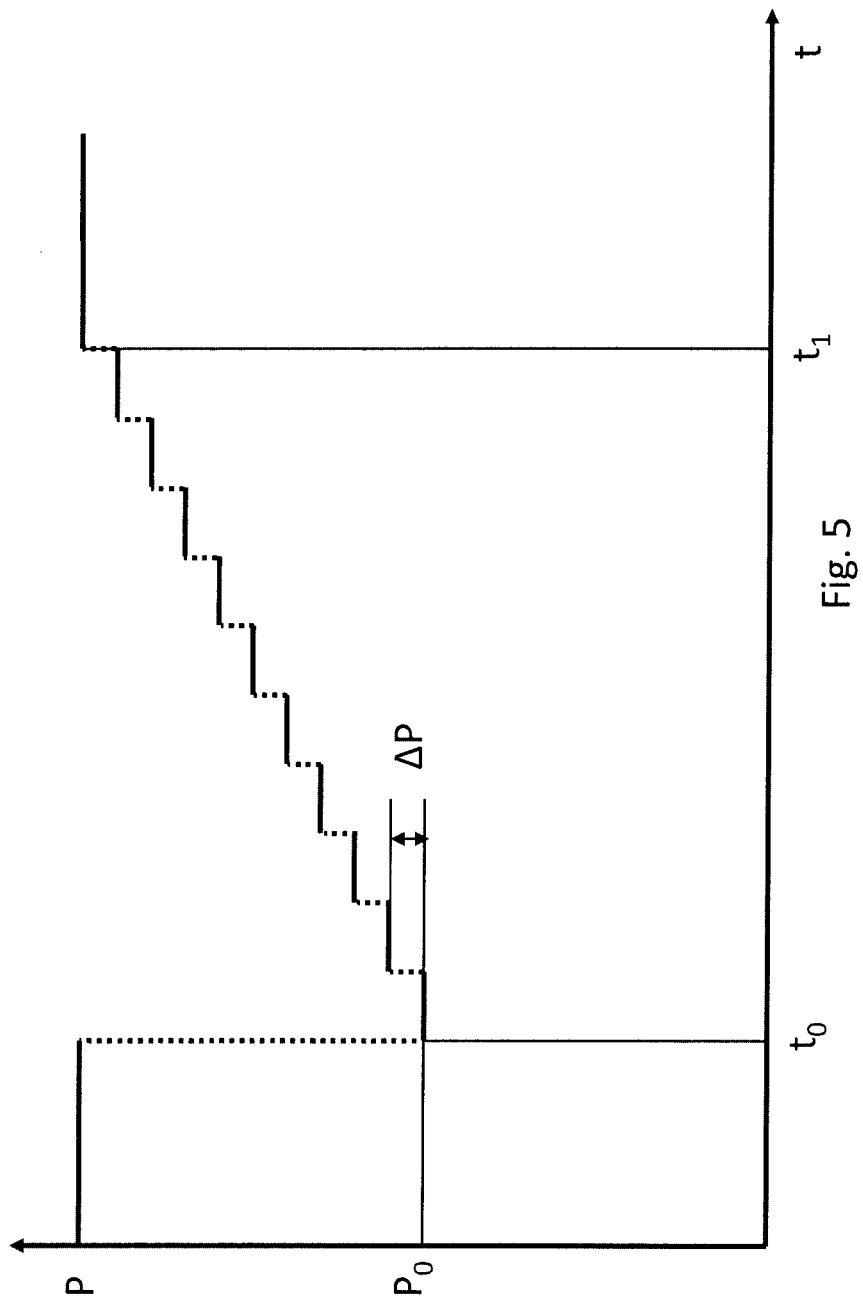
FIG. 5 shows an exemplary throttling method, in accordance with one or more aspects of the present invention.

FIG. 5 shows one embodiment of the development of the performance level P in percent over time, which may be implemented in a performance throttling unit, for example the performance throttling unit 217, triggered by a core throttle signal. Upon receipt of a core throttle signal at $t=t_0$ the performance level may be reduced to an initial throttle level $P_0$. The initial throttle level $P_0$ may be selected to be 7/16 of the unthrottled performance level. If no further throttle signal is received within a period Δt the performance level may be augmented by an amount ΔP again. The step is repeated until the unthrottled state is reached again or another core throttle signal is received.

FIG. 6 shows one example of a pattern of suspend signals which may be provided by a performance throttle unit to a core unit to obtain a desired performance level.

Figure 7:
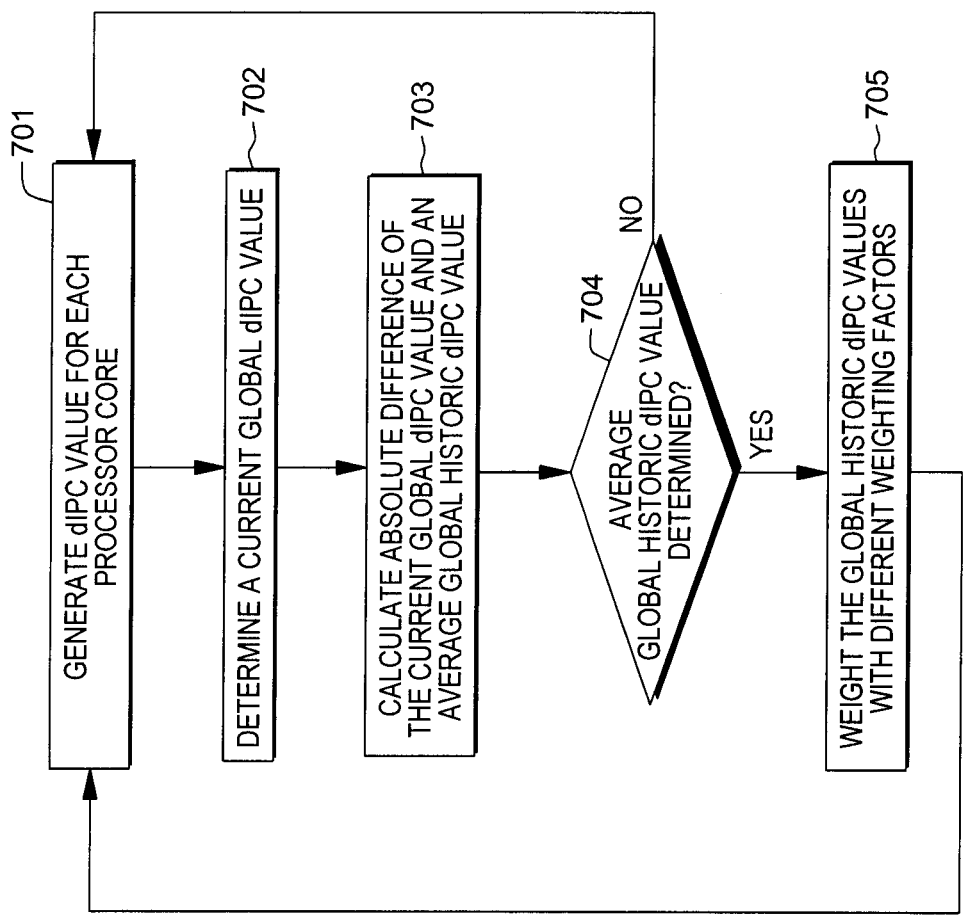
FIG. 7 shows an embodiment of a method for managing a processor, in accordance with one or more aspects of the present invention.

The flowchart of FIG. 7 illustrates one embodiment of a method for managing a processor, wherein the processor comprises a common supply rail and one or more processor cores, which are connected to the common supply rail.

Referring to FIG. 7, in a step 701, for each processor core a dIPC value indicative of an activity level of the respective processor core is a generated. From the generated dIPC values of the processor cores a current global dIPC value may be derived, in step 702. The absolute difference, i.e. the un-signed difference, of the current global dIPC value and an average global historic dIPC value may be calculated, in step 703. The average global historic dIPC value may be an average of former global dIPC values. The average may be a mode, i.e. the value that appears the most often, a median, i.e. the numerical value separating the higher half from the lower half, or a Pythagorean mean, in particular an arithmetic mean, a geometric mean or an harmonic mean, of the former global dIPC values. If the average global historic dIPC value of more than one global historic dIPC value is calculated 704, the different singular global historic dIPC values may be weighted with different weighting factors 705. Accordingly, the youngest and/or oldest of the former global dIPC values may have a stronger influence on the average global historic dIPC value.

What is claimed is:

1. A processor comprising:
    a common supply rail,
    one or more processor cores, wherein the one or more processor cores share the common supply rail and wherein each of the one or more processor cores comprises:
        an output for outputting a core dynamic instructions per cycle (dIPC) value and
        an input for inputting a core throttling signal, and
    a chip power management logic, wherein the chip power management logic comprises:
        at least one input for inputting the core dIPC value,
        a threshold register for registering a dIPC threshold value,
        a chip dIPC register for registering a current global dIPC value derived from at least one core dIPC value,
        at least one chip dIPC history register for registering at least one historic global dIPC value,
        a subtractor providing an absolute difference of an average historic global dIPC derived from the historic global dIPC value and the current global dIPC value, a magnitude comparator providing a throttling signal when the absolute difference is above the dIPC threshold value,
at least one output for outputting a core throttling signal to the at least one processor core.

2. The processor of claim 1, wherein the current global dIPC value is identical to the at least one core dIPC value or wherein the chip power management logic further comprises
a first adder providing the current global dIPC value as a sum of the core dIPC values.

3. The processor of claim 1, wherein the chip power management logic comprises only one historic global dIPC register and the average historic global dIPC value is identical to the at least one historic global dIPC value or wherein the chip power management logic comprises:
N historic global dIPC registers, wherein N is a defined number,
a second adder summing values of the N historic global dIPC registers,
a chip dIPC history register for registering the sum of the N historic global dIPC values, and
a divisor for providing the average historic global dIPC value as sum of the N historic global dIPC values divided by N.

4. The processor of claim 1, wherein the threshold register is fixed or wherein the threshold register is configurable.

5. The processor one of claim 1, wherein the processor core comprises a core power management logic, wherein the core power management logic comprises:
an input for inputting at least one core event,
an input for receiving a core throttling signal,
an output for outputting a core dIPC value derived from the at least one core event,
a power throttling unit for generating a sequence of suspend signals upon receipt of a throttling signal,
an output for outputting a suspend pattern.

6. The processor of claim 5, wherein the core power management logic comprises:
an inputs for inputting S1 core events, where S1 is a defined number,
a selector for selecting S2 of the S1 core events, where S2 is another defined number,
an adder for adding the S2 core events and to obtain a dIPC core cycle value,
a dIPC core cycle register for storing the dIPC core cycle value, and wherein the core dIPC value is derived from the dIPC core cycle value.

7. The processor of claim 6, wherein the core power management logic comprises:
an adder for summing the dIPC core cycle value over a predetermined number of cycle times S3, where S3 is a further defined number, and
a core dIPC value register for storing the sum of the S3 dIPC core cycle values, and wherein the core dIPC value is derived from the sum of the S3 dIPC core cycle values.

8. The processor of claim 6, wherein the core power management logic comprises a weighting unit to attribute a weight to at least one of the S2 core events before adding the S2 core events.

9. The processor of claim 6, wherein the core power management logic comprises:
a selector for selecting S4 consecutive bits of the dIPC core cycle value stored in the dIPC core cycle register or the sum of the dIPC core cycle values stored in the core dIPC value register for obtaining the core dIPC value, where S4 is another defined number.

10. The processor of claim 9, wherein the core power management logic comprises:
a configurable dIPC value selection register for selecting which consecutive S4 bits of the dIPC core cycle value stored in the dIPC core cycle register or the sum of the dIPC core cycle values stored in the core dIPC value register are selected.

11. The processor of claim 9, wherein the core power management logic comprises an overflow handler for performing overflow handling before outputting the core dIPC value.

12. A method for managing a processor, the processor comprising a common supply rail and one or more processor cores being connected to the common supply rail, the method comprising:
generating for each processor core a dynamic instructions per cycle (dIPC) value indicative of an activity level of the respective processor core;
deriving a current global dIPC value from the dIPC values of the one or more processor cores;
calculating an absolute difference of the current global dIPC value and an average global historic dIPC value;
comparing the absolute difference of the current global dIPC value and the average global historic dIPC value with a threshold global dIPC value; and
triggering a threshold signal if the absolute difference of the current global dIPC value and the average global historic dIPC value is above the threshold global dIPC value.

13. The method of claim 12, further comprising:
adding the dIPC values of the cores to obtain the current global dIPC value.

14. The method of claim 12, further comprising:
calculating the average global historic dIPC value based on at least two global historic dIPC values.

15. A computer program product for managing a processor, the processor comprising a common supply rail and one or more processor cores connected to the common supply rail, the computer program product comprising:
a computer readable storage medium having program instructions embodied therewith, the program instructions being executable by a processor to perform a method, the method comprising:
generating for each processor core a dynamic instructions per cycle (dIPC) value indicative of an activity level of the respective processor core;
deriving a current global dIPC value from the dIPC values of the one or more processor cores;
calculating an absolute difference of the current global dIPC value and an average global historic dIPC value;
comparing the absolute difference of the current global dIPC value and the average global historic dIPC value with a threshold global dIPC value; and
triggering a threshold signal if the absolute difference of the current global dIPC value and the average global historic dIPC value is above the threshold global dIPC value.

16. The computer program product of claim 15, wherein the method further comprises:
adding the dIPC values of the cores to obtain the current global dIPC value.

17. The computer program product of claim 15, wherein the method further comprises:

calculating the average global historic dIPC value based on at least two global historic dIPC values.

\* \* \* \* \*